(12) United States Patent
Liu

(10) Patent No.: US 10,595,664 B2
(45) Date of Patent: Mar. 24, 2020

(54) INFUSION BEVERAGE BREWING DEVICE

(71) Applicant: GINO CREATION CO., LTD., Taipei (TW)

(72) Inventor: Tsung-Hsi Liu, Taipei (TW)

(73) Assignee: GINO CREATION CO., LTD., Taipei (TW)

( * ) Notice: Subject to any disclaimer, the term of this patent is extended or adjusted under 35 U.S.C. 154(b) by 756 days.

(21) Appl. No.: 15/207,616

(22) Filed: Jul. 12, 2016

(65) Prior Publication Data
US 2017/0020327 A1 Jan. 26, 2017

(30) Foreign Application Priority Data

Jul. 20, 2015 (TW) .............................. 104123401 A

(51) Int. Cl.
| A47J 31/00 | (2006.01) |
| A47J 31/12 | (2006.01) |
| A47J 31/06 | (2006.01) |
| A47J 31/10 | (2006.01) |
| A47J 31/56 | (2006.01) |

(52) U.S. Cl.
CPC ........... *A47J 31/12* (2013.01); *A47J 31/0663* (2013.01); *A47J 31/103* (2013.01); *A47J 31/56* (2013.01)

(58) Field of Classification Search
CPC .. A47J 31/00; A47J 31/40; A47J 31/44; A47J 31/46; A47J 31/12
USPC ........................... 99/279, 280, 282, 283, 293
See application file for complete search history.

(56) References Cited

U.S. PATENT DOCUMENTS

| 3,793,933 A | * | 2/1974 | Weber | ................. | A47J 31/0573 |
| | | | | | 99/283 |
| 3,844,206 A | * | 10/1974 | Weber | ................. | A47J 31/0573 |
| | | | | | 99/282 |
| 4,676,390 A | * | 6/1987 | Harris | ................ | B60K 15/0406 |
| | | | | | 220/203.06 |
| 4,706,555 A | * | 11/1987 | Nakamura | .............. | A47J 31/42 |
| | | | | | 99/283 |

(Continued)

FOREIGN PATENT DOCUMENTS

| CN | 101618786 B | 4/2011 |
| CN | 202060608 U | 12/2011 |

(Continued)

*Primary Examiner* — Dana Ross
*Assistant Examiner* — Ayub A Maye
(74) *Attorney, Agent, or Firm* — Li & Cai Intellectual Property (USA) Office

(57) ABSTRACT

An infusion beverage brewing device includes a filter assembly and a brewing mechanism. The filter assembly has an outer filter cup and an inner filter cup. The inner filter cup has an inner cup-body, and the outer filter cup has an outer cup-body. A gap and a vapor diffusion outlet are formed between the outer cup-body and the inner cup-body. The outer filter cup has a bottom outlet disposed a sealing device. The brewing mechanism has a cup retainer, a cover and a controlling device. The cover is disposed on the cup retainer, and the controlling device is connected to the cover. The filter assembly is disposed in the cup retainer. The cover is selectively disposed on the filter assembly. The cover is disposed with a sprinkle-nozzle and a vapor portal. The vapor portal corresponds to the vapor inlet of the inner filter cup.

9 Claims, 16 Drawing Sheets

(56) References Cited

U.S. PATENT DOCUMENTS

| | | | | |
|---|---|---|---|---|
| 4,805,523 A * | 2/1989 | Stuckey | A47J 31/106 | 137/599.16 |
| 5,325,764 A * | 7/1994 | Nakamura | A47J 31/605 | 99/282 |
| 6,065,609 A * | 5/2000 | Lake | A47J 31/02 | 206/0.5 |
| 6,220,147 B1 * | 4/2001 | Priley | A47J 31/0615 | 99/299 |
| 7,503,254 B2 * | 3/2009 | Noordhuis | A47J 31/0678 | 99/295 |
| 7,509,908 B1 * | 3/2009 | Lassota | A47J 31/4475 | 99/280 |
| 9,332,875 B2 * | 5/2016 | White | A47J 31/061 | |
| 2002/0096055 A1 * | 7/2002 | Heczko | A23L 2/00 | 99/323.3 |
| 2007/0221066 A1 * | 9/2007 | Sullivan | A47J 31/3695 | 99/279 |
| 2008/0264268 A1 | 10/2008 | Tjen | | |
| 2010/0288131 A1 * | 11/2010 | Kilber | A47J 31/0673 | 99/295 |
| 2012/0121779 A1 * | 5/2012 | Lai | A47J 31/3623 | 426/433 |
| 2013/0337132 A1 * | 12/2013 | Fenna | A47J 31/56 | 426/433 |
| 2016/0235245 A1 * | 8/2016 | Hanes | A47J 31/56 | |

FOREIGN PATENT DOCUMENTS

| | | |
|---|---|---|
| CN | 103004998 A | 4/2013 |
| CN | 202891614 U | 4/2013 |
| CN | 103238761 A | 8/2013 |
| CN | 104172928 A | 12/2014 |
| CN | 104334057 A | 2/2015 |
| CN | 204839159 U | 12/2015 |
| TW | M410523 U1 | 9/2011 |

* cited by examiner

INFUSION BEVERAGE BREWING DEVICE

BACKGROUND

1. Technical Field

The present disclosure relates to an infusion beverage brewing device, in particular, to an infusion beverage brewing device adapted to different brewing substances and various brewing processes.

2. Description of Related Art

Using the conventional siphon coffeemaker to make coffee usually includes the following steps. Before brewing, a bottom container is filled with fresh water, a filter is installed by dropping it in a top container, the coffee powders which have an amount corresponding to the water are placed on the filter, and the siphon tube attached to the bottom of the top container is inserted into the bottom container. After that, an alcohol burner is placed beneath the bottom container to heat the water. When the water poured into the bottom container is boiled, the vapor gas pushes the water up the top container through the siphon tube to brew the coffee powders. After cooling down, as the vapor gas in the bottom container starts to contract, shrink, and change back to water, it creates a partial vacuum of negative pressure, and pulls the brewed coffee through the filter back to the bottom container so as to complete the brewing process. Although the brewed coffee has the distinctive flavor differentiating it from the instant coffee, the brewing process is complicated and time-consuming, and the taste depends on the individual's brewing skills and preference.

When it comes to the semi-automatic siphon coffeemaker, as it works with a machine to deliver the vapor gas, compress the water to the top container, and to release the pressure to pull the brewed coffee back to the bottom container, the brewing process is much easier compared with the conventional siphon coffeemaker. However, the semi-automatic siphon coffeemaker is not economically available.

The infusion beverage brewing device of the present disclosure is provided to overcome these shortcomings.

SUMMARY

An exemplary embodiment of the present disclosure provides an infusion beverage brewing device used to brew, reheat and stir the brewing substance, thereby achieving the better effect on extracting the brewing substance and simplifying the brewing process.

According to one exemplary embodiment of the present disclosure, an infusion beverage brewing device is provided. The infusion beverage brewing device includes a filter assembly and a brewing mechanism. The filter assembly includes an outer filter cup and an inner filter cup. The outer filter cup has an outer cup-body, and a top of the outer cup-body has a first upper edge, the outer cup-body has a bottom outlet disposed with a sealing device. The inner filter cup has an inner cup-body, a top of the inner cup-body has a second upper edge, a bottom of the inner cup-body is disposed with a filter screen, the top of the inner cup-body is disposed a vapor inlet, the inner cup-body of the inner filter cup is received by the outer cup-body of the outer filter cup, and the second upper edge is stacked on the first upper edge. There is a gap between the inner cup-body and the outer cup-body. A vapor diffusion outlet is between the inner cup-body and the outer cup-body, and the vapor diffusion outlet connects with the vapor inlet. The brewing mechanism has a cup retainer, a cover and a controlling device. The cover is disposed on the cup retainer, the controlling device is connected to the cover, the filter assembly is placed in the cup retainer, the first upper edge of the outer filter cup is placed on the cup retainer, the cover is selectively disposed on the filter assembly, the cover is disposed with a sprinkle-nozzle and a vapor portal thereon, and the vapor portal corresponds to the vapor inlet of the inner filter cup.

According to the other exemplary embodiment of the present disclosure, an infusion beverage brewing device is provided. The infusion beverage brewing device includes a filter assembly and a brewing mechanism. The filter assembly has an outer filter cup and a filter disc. The outer filter cup has an outer cup-body, a top of the outer cup-body has a first upper edge, the outer cup-body has a bottom outlet disposed with a sealing device, a groove is formed at a bottom of an inner edge of the outer cup-body of the outer filter cup, the top of the outer cup-body is disposed with a vapor inlet, a side of the outer cup-body is disposed with a vapor diffusion outlet, the vapor diffusion outlet connects with the vapor inlet, and the vapor diffusion outlet extends from the side of the outer cup-body to the bottom of the outer cup-body. The filter disc includes a filter screen and an O-ring, the O-ring surrounds and is connected on an outer periphery of the filter screen, the filter screen is disposed with a grasp rod, the filter disc is received in the outer cup-body of the outer filter cup, the O-ring engages and is positioned in the groove, and the vapor diffusion outlet connects with the space between the bottom of the filter disc and the outer cup-body. The brewing mechanism includes a cup retainer, a cover and a controlling device. The cover is disposed on the cup retainer, the controlling device is connected to the cover, the filter assembly is placed in the cup retainer, the first upper edge of the outer filter cup is placed on the cup retainer, the cover is selectively disposed on the filter assembly, a sprinkle-nozzle and a vapor portal are disposed on the cover, and the vapor portal corresponds to the vapor inlet of the outer filter cup.

To sum up, an infusion beverage brewing device provided by the present disclosure includes a filter assembly and a brewing mechanism. The sprinkle-nozzle formed on the cover of the brewing mechanism sprays hot water to the brewing substance in the filter assembly. The filter assembly is disposed with a vapor inlet, a vapor diffusion outlet and a filter screen, and the outer filter cup has a bottom outlet disposed with a sealing device. The vapor is introduced by the vapor inlet, and moves downwardly through the vapor diffusion outlet and then upwardly to enter the inner cup-body through the filter screen to reheat and stir the brewing substance, thereby achieving a better effect on the extraction process and simplifying the brewing process.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
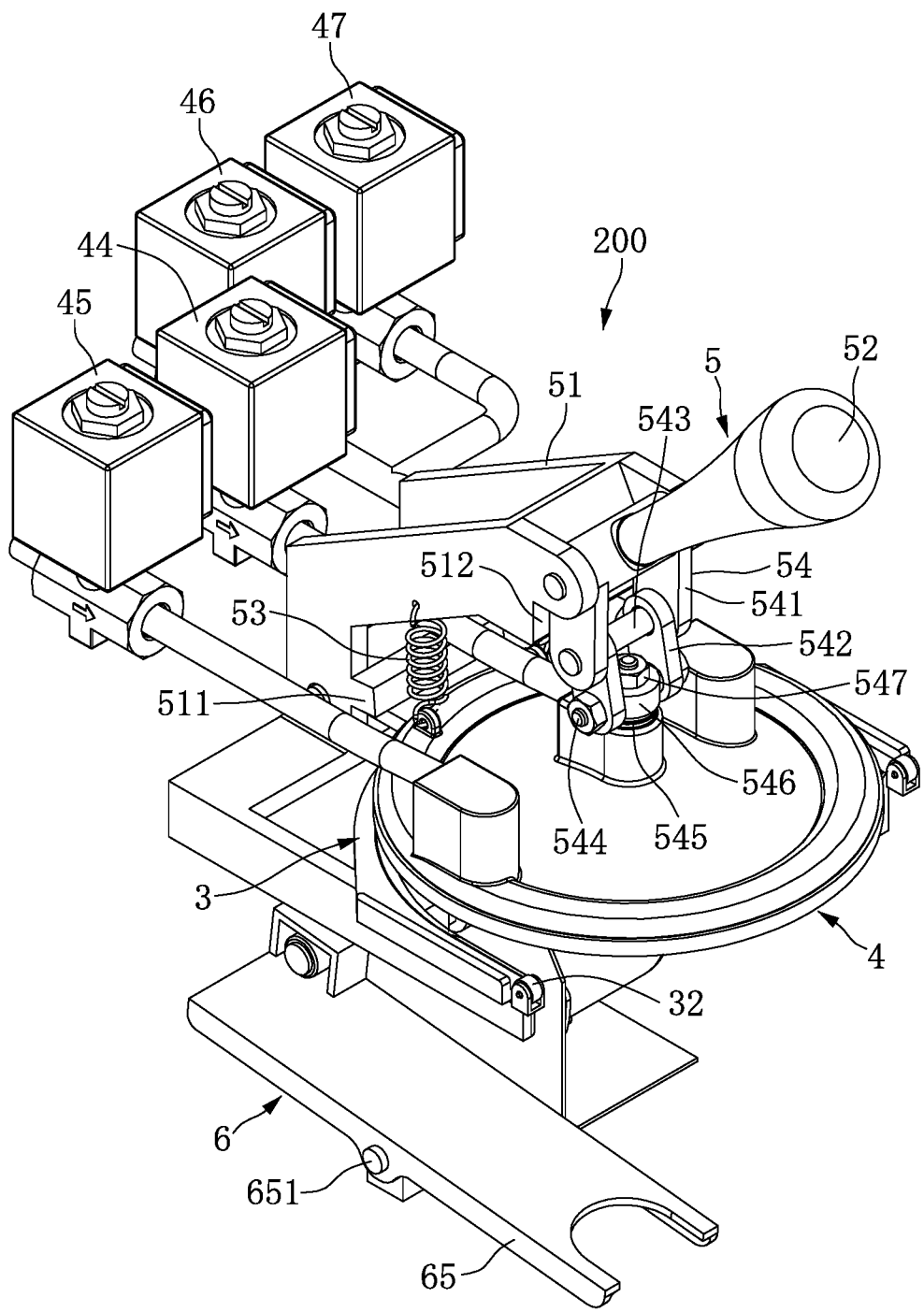
FIG. 1 is a three-dimensional view of the first embodiment of the brewing mechanism according to the present disclosure.
Figure 2:
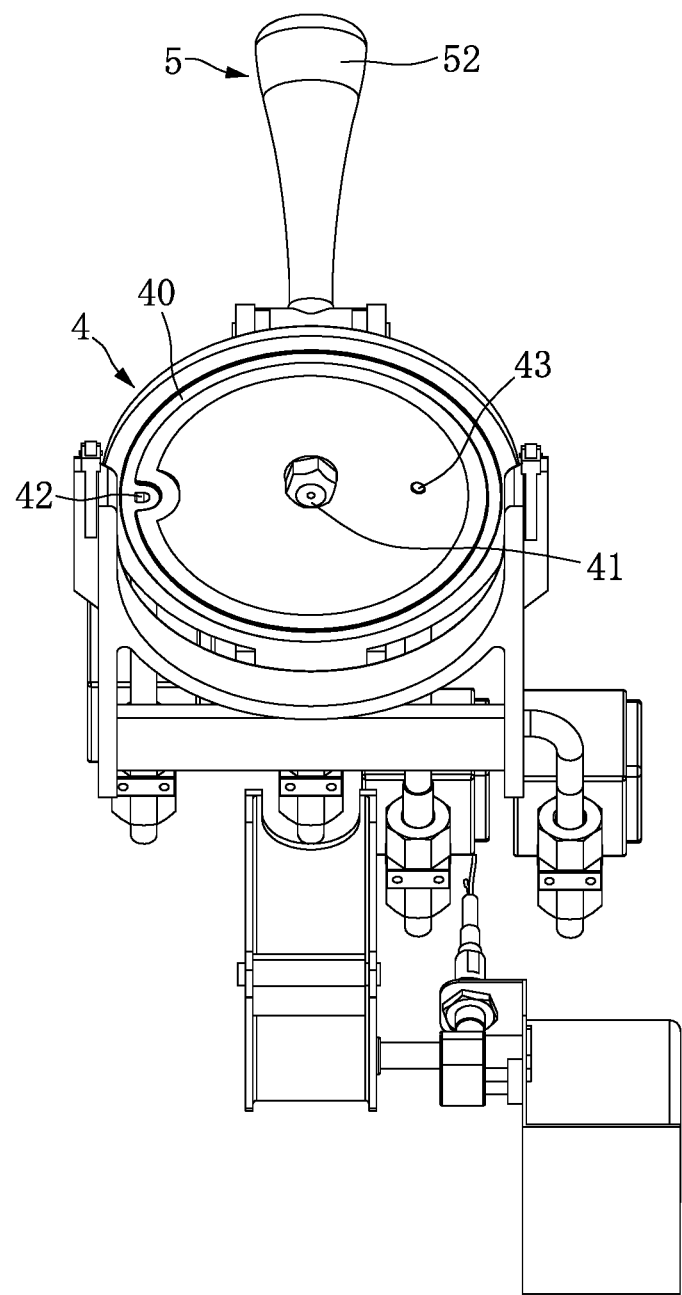
FIG. 2 is a three-dimensional view showing another angle of the first embodiment of the brewing mechanism according to the present disclosure.
Figure 3:
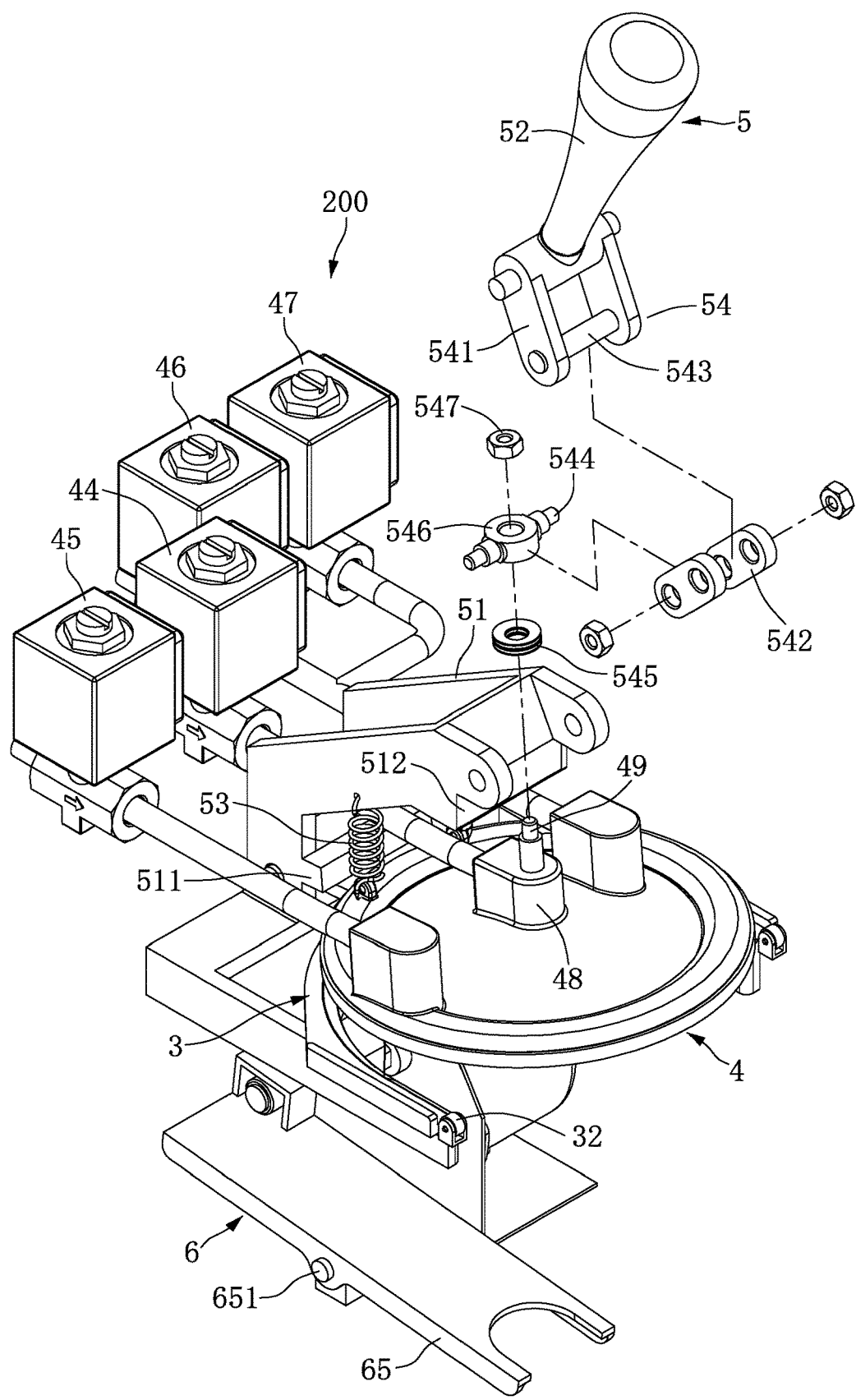
FIG. 3 is a three-dimensional exploded view of the first embodiment of the brewing mechanism according to the present disclosure.
Figure 4:
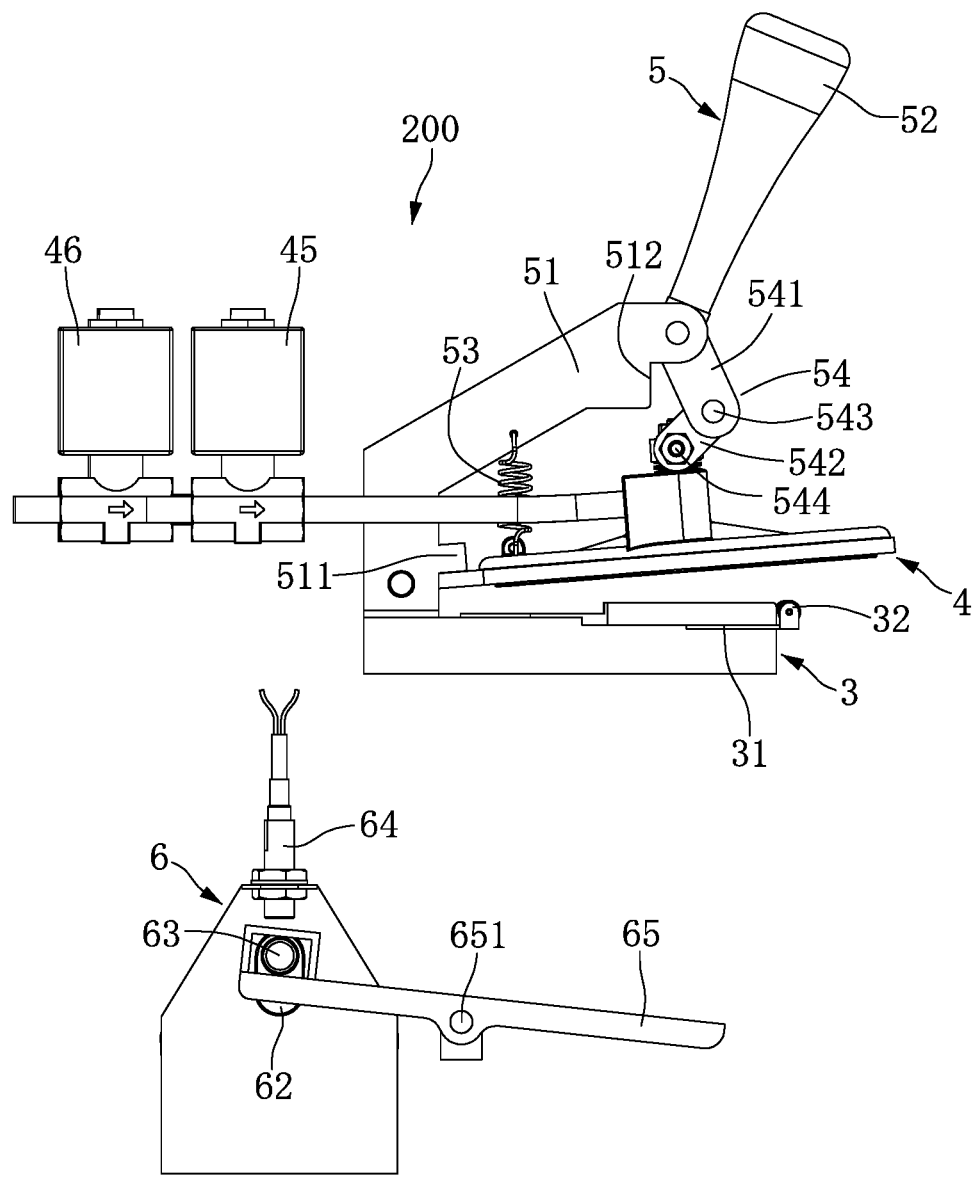
FIG. 4 is a side view of the first embodiment of the brewing mechanism according to the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Figure 5:
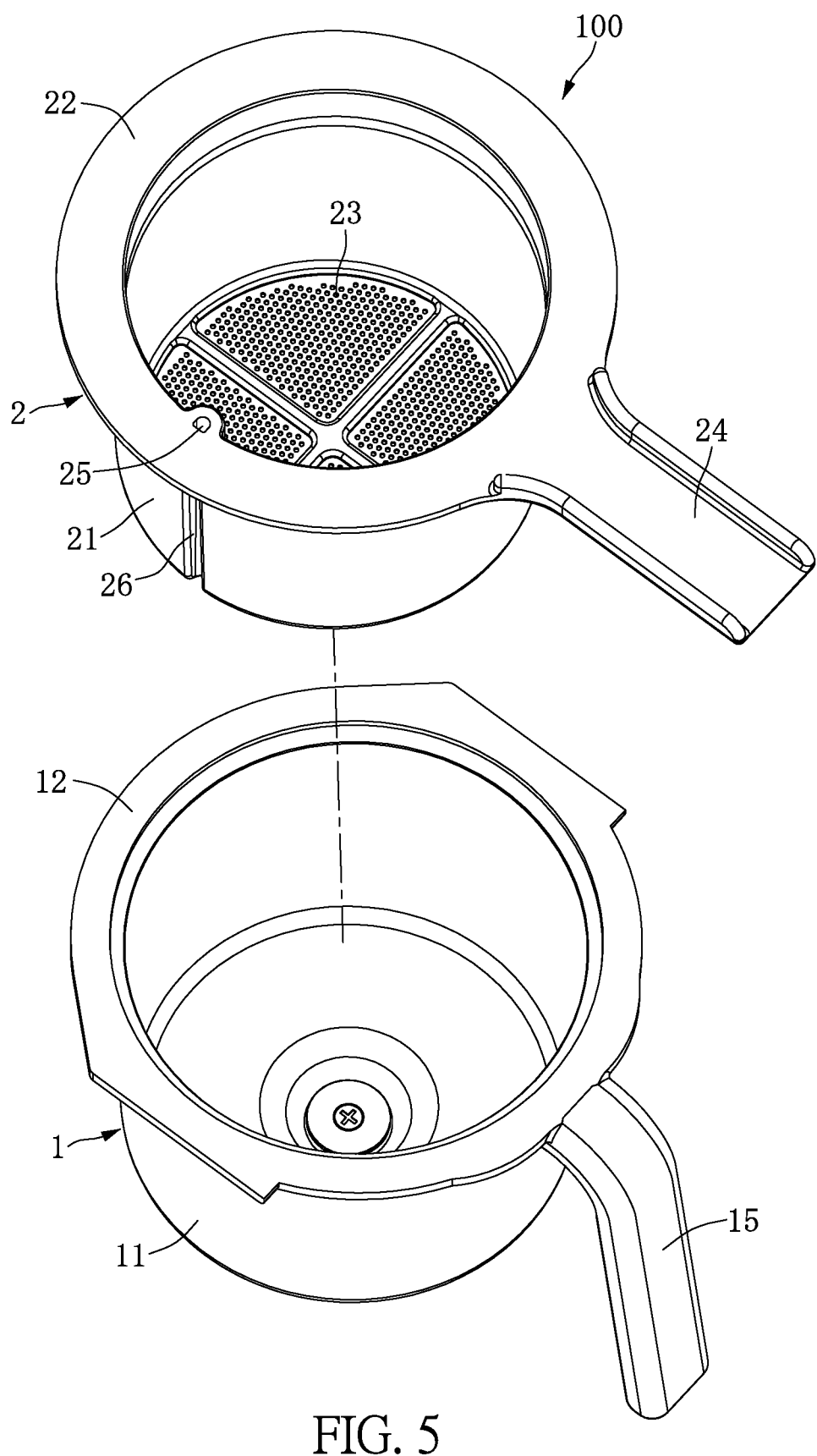
FIG. 5 is a three-dimensional exploded view of the first embodiment of the filter assembly according to the present disclosure.
Figure 6:
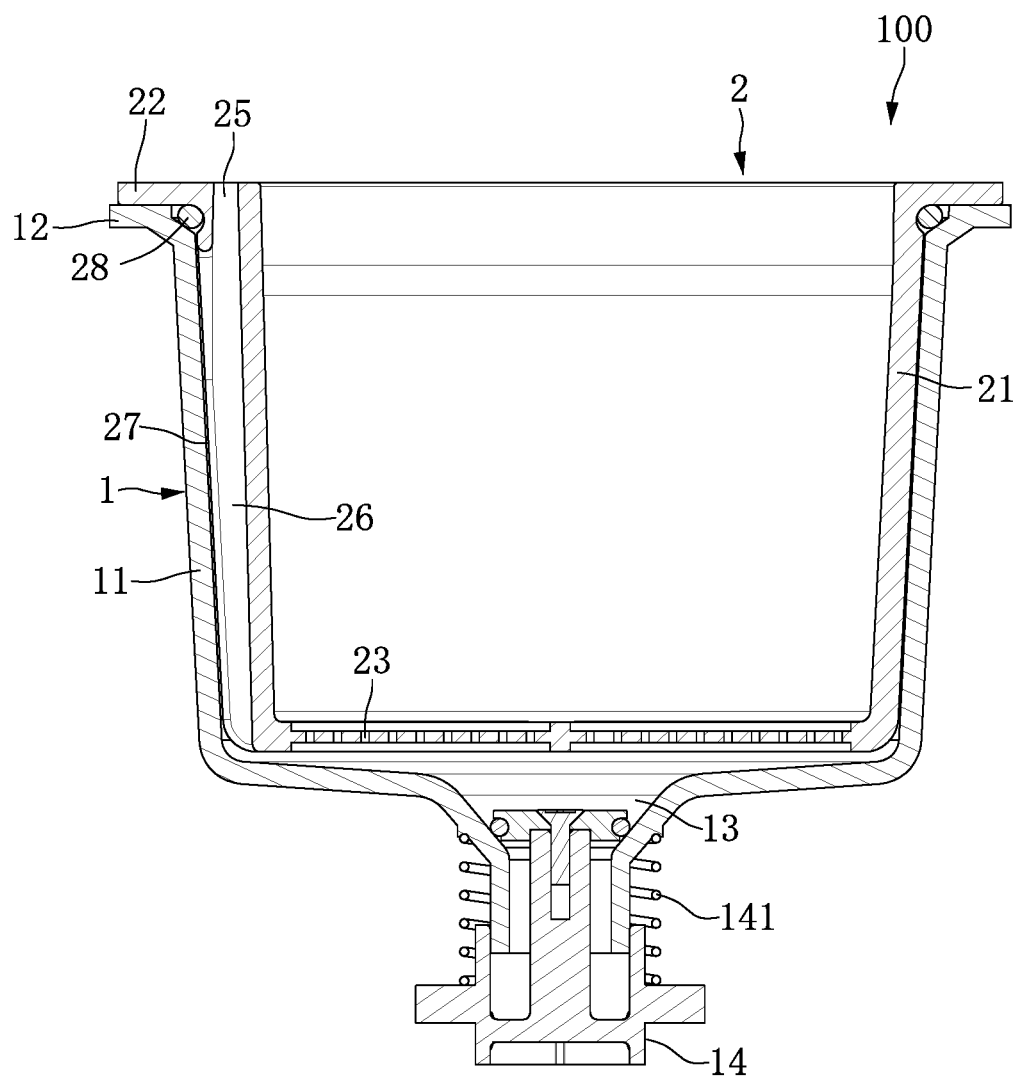
FIG. 6 is a sectional view of the first embodiment of the filter assembly according to the present disclosure.

Please refer to FIG. 5 and FIG. 6. An infusion beverage brewing device is provided, including a filter assembly 100 having an outer filter cup 1 and an inner filter cup 2. The outer filter cup 1 has an outer cup-body 11 with a circular top opening, and a top of the outer cup-body 11 has a first upper edge 12 protruding from an outer periphery of the outer cup-body 11 and surrounding and connected to the periphery of the top of the outer cup-body 11. The outer cup-body 11 has a bottom outlet 13 disposed with a sealing device 14. The sealing device 14 is normally closed and disposed with a spring 141 for promoting the sealing effect. When the sealing device 14 is pulled up, the liquid in the filter assembly 100 releases. An outer edge of the outer cup-body 11 is disposed with a first holder 15 for holding the outer filter cup 1.

The inner filter cup 2 has an inner cup-body 21, and a top and a bottom of the inner cup-body 21 both have a circular opening. The top of the inner cup-body 21 has a second upper edge 22 protruding from an outer periphery of the inner cup-body 21 and surrounding and connected the periphery of the top of the inner cup-body 21. The bottom of the inner cup-body 21 is disposed with a filter screen 23, and an outer edge of the inner cup-body 21 is disposed with a second holder 24 for holding the inner filter cup 2.

The top of the inner cup-body 21 is disposed with a vapor inlet 25, and an outer edge of the inner cup-body 21 is disposed with a vapor diffusion outlet 26. The vapor diffusion outlet 26 is connected to the vapor inlet 25, so that the vapor introduced from the vapor inlet 25 can be diffused through the vapor diffusion outlet 26. The vapor diffusion outlet 26 extends to the bottom of the inner cup-body 21.

The inner filter cup 2 is received by the outer filter cup 1, and the inner cup-body 21 of the inner filter cup 2 is placed in the outer cup-body 11 of the outer filter cup 1. There is a gap between the inner cup-body 21 and the outer cup-body 11, and the vapor diffusion outlet 26 is also between the inner cup-body 21 and the outer cup-body 11. The second upper edge 22 is stacked on the first upper edge 12, and an O-ring 28 is disposed on the second upper edge 22 of the inner filter cup 2, wherein the O-ring 28 is between the second upper edge 22 and the first upper edge 12 for promoting an air-tight sealing effect.

The vapor is introduced by the vapor inlet 25 of the inner filter cup 2 and diffused through the vapor diffusion outlet 26, and moves downwardly along the gap 27 and then upwardly into the inner filter cup 2 through the filter screen 23, so as to reheat and stir the brewing substance. In another embodiment, the vapor diffusion outlet 26 recesses in an inner edge (not shown) of the outer cup-body 11 and is between the inner cup-body 21 and the outer cup-body 11, thereby reheating and stirring the brewing substance.

Figure 7:
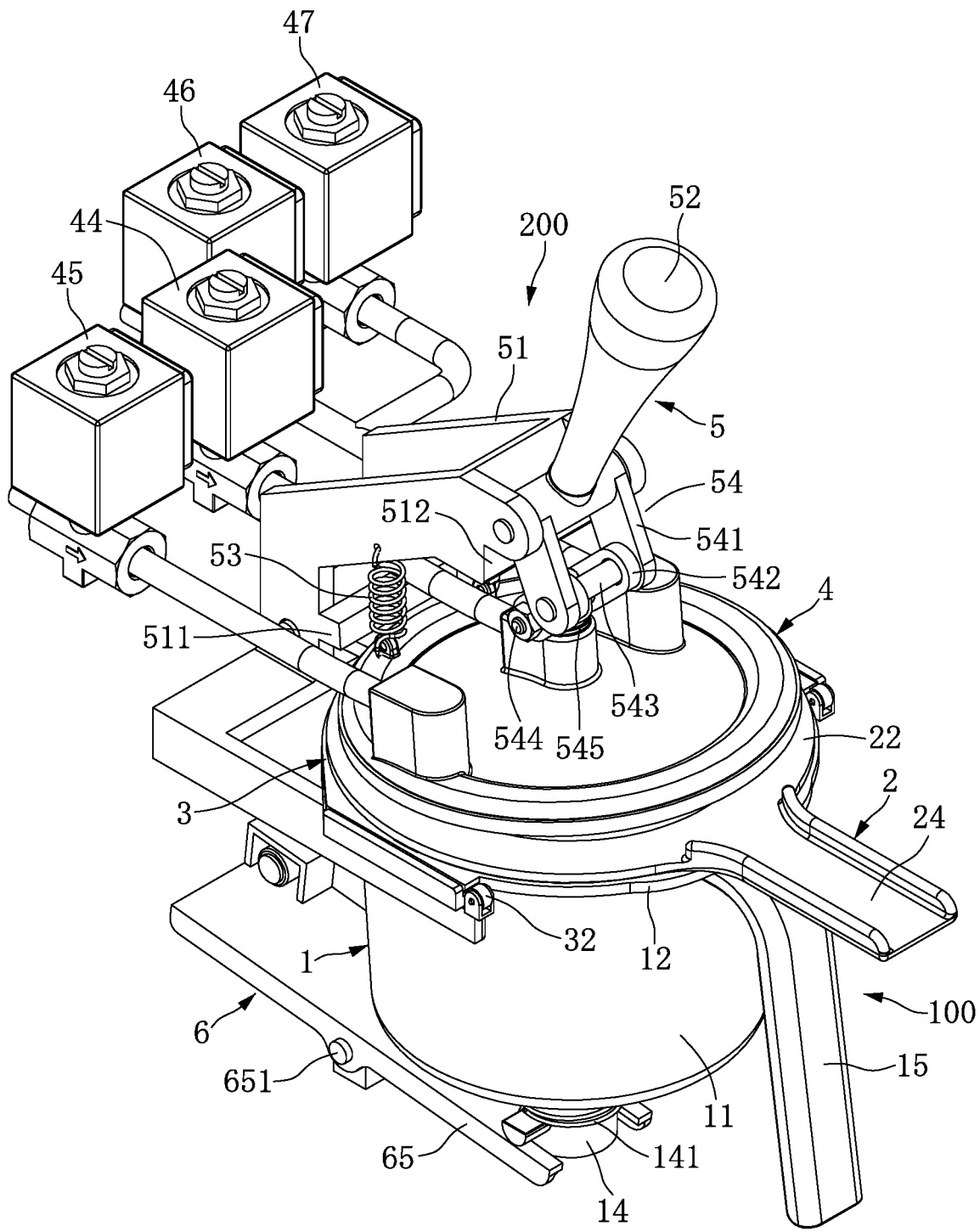
FIG. 7 is a three-dimensional view of the first embodiment of the infusion beverage brewing device according to the present disclosure.
Figure 8:
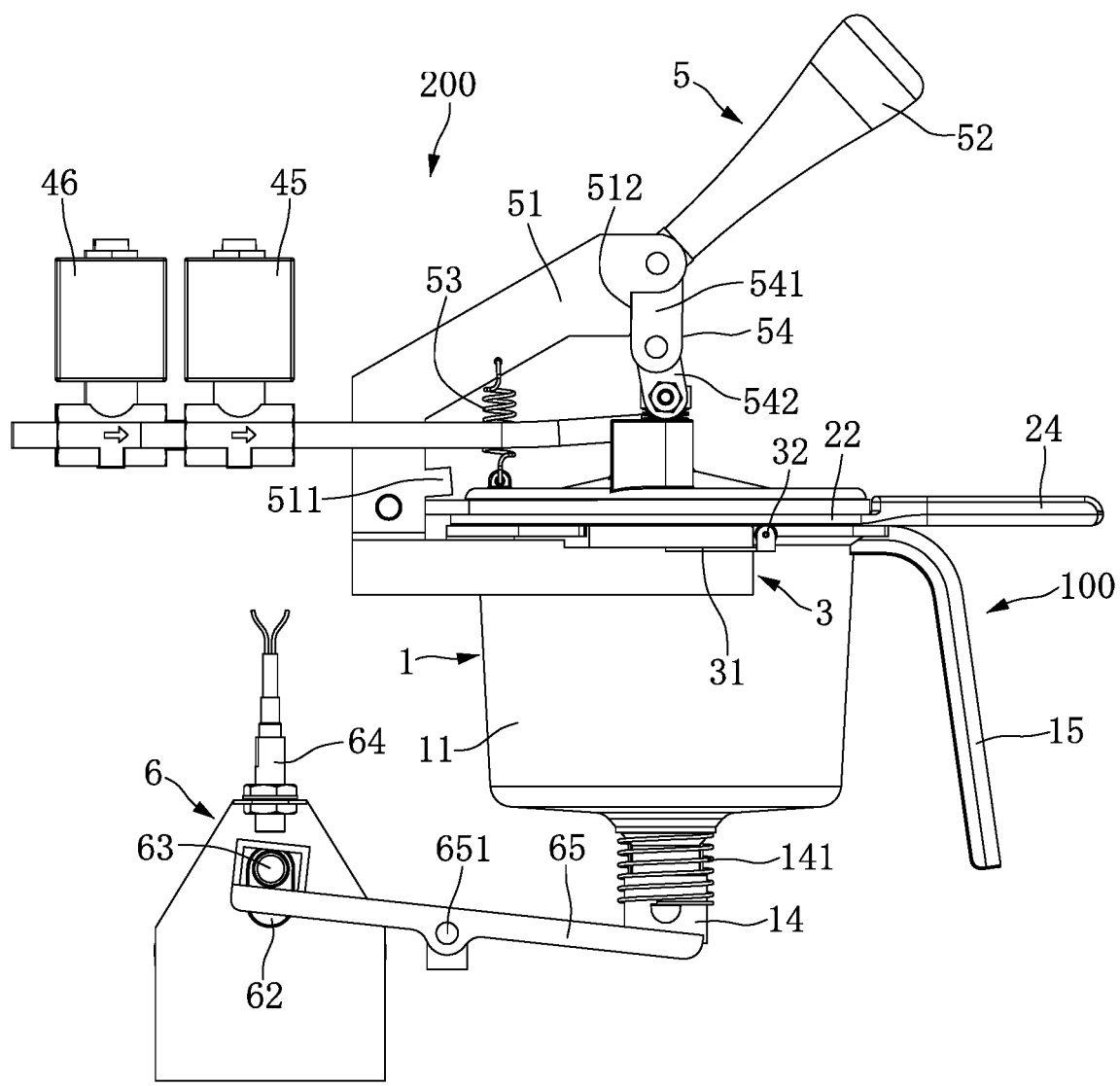
FIG. 8 is a side view of the first embodiment of the infusion beverage brewing device according to the present disclosure.
Figure 9:
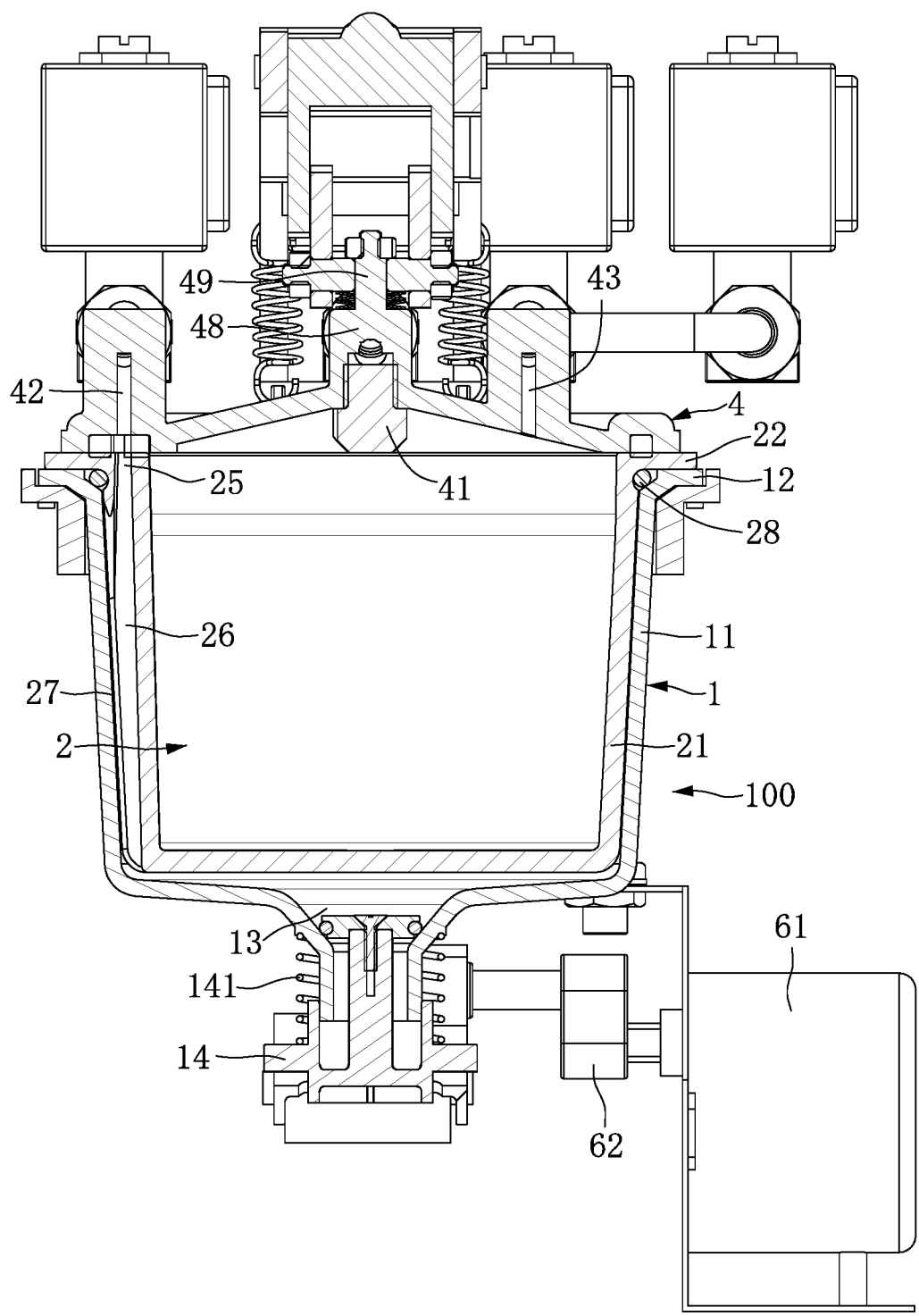
FIG. 9 is a sectional view of the first embodiment of the infusion beverage brewing device according to the present disclosure.

Please refer to FIG. 1 to FIG. 9 together. The infusion beverage brewing device of the present disclosure includes a brewing mechanism 200. The brewing mechanism 200 includes a cup retainer 3, a cover 4 and a controlling device 5. The cup retainer 3 is used to bear the filter assembly 100, and has a U-shaped structure, but it is not limited thereto. When the filter assembly 100 is placed in the cup retainer 3 (as shown in FIG. 7, FIG. 8 and FIG. 9), the first upper edge 12 of outer filter cup 1 is on the cup retainer 3, and the shape of the cup retainer 3 corresponds to the size of the outer filter cup 1, allowing it to hold the filter assembly 100. Two sides of the cup retainer 3 are respectively disposed with an elastic piece 31, a front end of the elastic piece 31 is pivotally disposed with a wheel 32, and the wheel 32 is at a front end of the cup retainer 3, thereby positioning the filter assembly 100.

When the filter assembly 100 has been placed in the cup retainer 3, the wheel 32 is located in front of the first upper edge 12 of the outer filter cup 1, it can be confirmed that the filter assembly 100 is positioned. If the filter assembly 100 is not positioned correctly, the elastic piece 31 provides a resilient buffer to avoid the other parts suffering damage.

The cover 4 is disposed on the cup retainer 3, and selectively disposed on the filter assembly 100. A bottom of the cover 4 is disposed with a sealing gasket 40. The sealing gasket 40 is between the bottom of the cover 4 and the second upper edge 22 of the inner filter cup 2. The cover 4 is disposed with a sprinkle-nozzle 41, a vapor portal 42, and a vapor portal and discharge outlet 43 thereon. A hot water valve 44 is connected to the sprinkle-nozzle 41 for delivering hot water to the sprinkle-nozzle 41. The vapor portal 42 corresponds to the vapor inlet 25 of the inner filter cup 2, and is connected to a first vapor valve 45, so that the vapor produced by the first vapor valve 45 can be delivered to the vapor portal 42. The vapor portal and discharge outlet 43 is connected to a second vapor valve 46 and a discharge valve 47. The second vapor valve 46 is used to deliver the vapor to the vapor portal and discharge outlet 43, and the discharge valve 47 is used to discharge the vapor. While the first vapor valve 45 is turned on to execute the reheating and stirring process, the discharge valve 47 is turned on for discharging vapor. While the sealing device 14 is pulled up to release the liquid, the second vapor valve 46 is turned on to produce the vapor pressure to push the liquid so as to accelerate the release process, thereby saving operation time.

The controlling device 5 is connected to the cover 4 for opening and closing the cover 4. In the present embodiment, the controlling device 5 includes a fixed base 51, a handle 52, a tension spring 53 and a link member 54. The fixed base 51 is connected to the cup retainer 3, and one end of the handle 52 is pivotally disposed on the fixed base 51, so that the handle 52 is movable on the fixed base 51. The tension spring 53 is connected between the fixed base 51 and the cover 4. To be more precise, the tension spring 53 is connected between the fixed base 51 and a rear end of the cover 4. The fixed base 51 is disposed with a first positioning point 511, and the cover 4 can be pulled to contact the first positioning point 511 by the tension spring 53 to produce an inclined angle and a proper distance between the cover 4 and the cup retainer 3, thereby enabling the filter assembly 100 to be placed in the cup retainer 3.

The link member 54 is between the handle 52 and the cover 4. When the user moves the handle 52, the link member 54 links the cover 4 to open or close it. In the present embodiment, the link member 54 includes an upper link member 541, a lower link member 542, a first pivot axis 543, a second pivot axis 544 and a plurality of disc springs 545. Here, the disc spring may be other elastic bodies. One end of the upper link member 541 is connected to one end of the handle 52, so that the upper link member 541 can move with the handle 52 together. One end of the lower link member 542 is pivotally connected to the other end of the upper link member 541 through the first pivot axis 543, and the second pivot axis 544 is pivotally connected to the other end of the lower link member 542. A washer 546 is disposed between the second pivot axis 544, the top of the cover 4 is disposed with a connecting base 48, the connecting base 48 is disposed with a stud 49 thereon, the plurality of disc springs 545 are disposed between the washer 546 and the connecting base 48, and the stud 49 penetrates the plurality of disc springs 545 and the washer 546 and is fixed by a nut 547.

When the handle 52 is moved to drive the upper link member 541 and the lower link member 542 to press the washer 546, the plurality of disc springs 545 are used to press the cover 4 to bring the sealing gasket 40 disposed at the bottom of the cover 4 and the O-ring 28 of the inner filter cup 2 to the proper pressure, so as to achieve an airtight sealing effect. In addition, compressing the plurality of disc springs 545 enables the link member 54 to exceed the center line of the cover 4 to contact a second positioning point 515 of the fixed base 51, thereby preventing the link member 54 from separating from the handle 52 and the cover 4 (as shown in FIG. 8).

A liquid release controlling device 6 is disposed at the bottom of the filter assembly 100 for opening or closing the sealing device 14. Referring to FIGS. 8 and 9, the liquid release controlling device 6 includes a gear motor 61, a link arm 62, a roller 63, a sensing switch 64 and a lever 65. One end of the link arm 62 is connected to the axle center of the gear motor 61, the other end of the link arm 62 is pivotally connected to the roller 63, and the sensing switch 64 is disposed on the link arm 62, wherein the sensing switch 64 can be fixed properly on the link arm 62. The lever 65 supports the roller 63 and the bottom of the sealing device 14 through a fulcrum point 651, and moves based on the fulcrum point 651.

The sealing device 14 of the filter assembly 100 is normally closed. When the liquid has to be released in the brewing process, the gear motor 61 rotates the link arm 62 to drive the lever 65 to pull up the sealing device 14 of the filter assembly 100 so as to release the liquid. In the present embodiment, the gear motor 61 is a motor of 15 RPM. When the link arm 62 is rotated to a distance where the sensing switch 64 can sense the link arm 62, the gear motor 61 turns off. When positioning the filter assembly 100, it can avoid the sealing device 14 from being hit by the lever 65 because there is a distance between the lever 65 and the sealing device 14. When the liquid has to be released in the brewing process, the gear motor 61 does a rotation of 180 degrees in two seconds to rotate the link arm 62 to drive the lever 65 to pull up the sealing device 14 to release the liquid. When the brewing process is completed, an automatic control system (not shown) is set to activate the gear motor 61 to rotate the link arm 62, and when the link arm 62 is rotated to a distance where the sensing switch 64 can sense the link arm 62, the gear motor 61 turns off, and the sealing device 14 returns to the closed status. Here, whenever the link arm 62 is rotated to a distance where the sensing switch 64 can sense the link arm 62, the link arm 62 is then rotated to return to the initial position by the gear motor 62, thereby avoiding the upper and lower dead points.

When using the beverage infusion brewing device of the present disclosure, the inner filter cup 2 in which the substances such as coffee powders or tea leaves have been properly placed is received by the outer filter cup 1, and the filter assembly 100 is placed in the cup retainer 3. When the filter assembly 100 has been positioned in the cup retainer 3, the handle 52 is pulled downwardly to cover the filter assembly 100 by the cover 4 to achieve the airtight sealing effect. After that, the operation button of the beverage infusion brewing device is pressed to activate the hot water valve 44 and the discharge valve 47 at the same time. When a certain amount of water is filled, the hot water valve 44 is turned off. After the hot water is filled, the air in the inner filter cup 2 is discharged by the discharge valve 47, and the hot water is contained in the inner filter cup 2 because of the sealing device 14. Next, the first vapor valve 45 is turned on to produce vapor, and the vapor is introduced by the vapor inlet 25 of the inner filter cup 2 and diffused through the vapor diffusion outlet 26, and moves downwardly along the gap 27 between the inner filter cup 2 and the outer filter cup 1 and then upwardly into the inner filter cup 2 through the filter screen 23. Finally, the compressed air is discharged by the discharge valve 47. Because the vapor introduced into the inner filter cup 2 can reheat and stir the brewing substance, the brewing substance can be extracted easily to produce the distinctive flavor.

Figure 14:
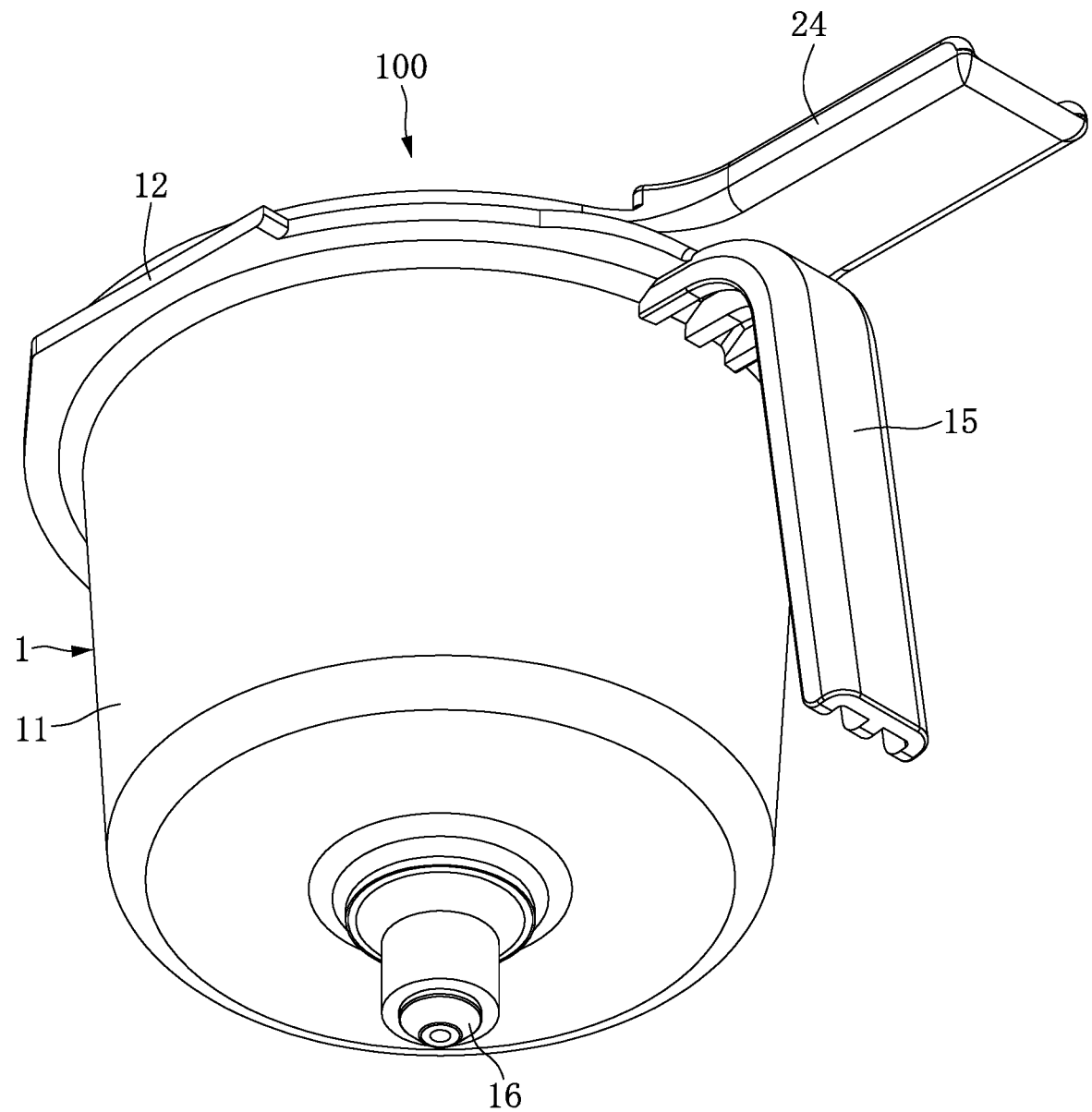
FIG. 14 is a three-dimensional view of the fourth embodiment of the filter assembly according to the present disclosure.

When the vapor has been delivered, the first vapor valve 45 is turned off by the automatic control system (not shown). The automatic control system can be set to keep soaking the brewing substance or to release the liquid. When it is set to release the liquid, the gear motor 61 is activated to have a rotation of 180 degrees to pull up the sealing device 14 of the filter assembly 100 to release the liquid. To accelerate the brewing process to save the operation time, the first vapor valve 45 and the discharge valve 47 can both be turned off, and the second vapor valve 46 turned on to produce the vapor pressure to push the liquid in the release process. When the liquid has been released totally, the second vapor valve 46 is turned off. When a substance such as tea leaves needs to be brewed by many times, the automatic control system is set to execute the multistage brewing process. When the drip coffee mode is set, the sealing device 14 of the filter assembly 100 is pulled up during the whole brewing process. Alternatively, the outer filter cup 1 can be disposed with a nozzle used to deliver water continuously (as shown in FIG. 14). In addition, the beverage infusion brewing device of the present disclosure can connect to a cell phone, tablet, computer program, and so on, and chain stores can also apply the beverage infusion brewing device of the present disclosure to connect to the Point of Sale (POS), so that the brewing process can be executed at a distance.

Figure 10:
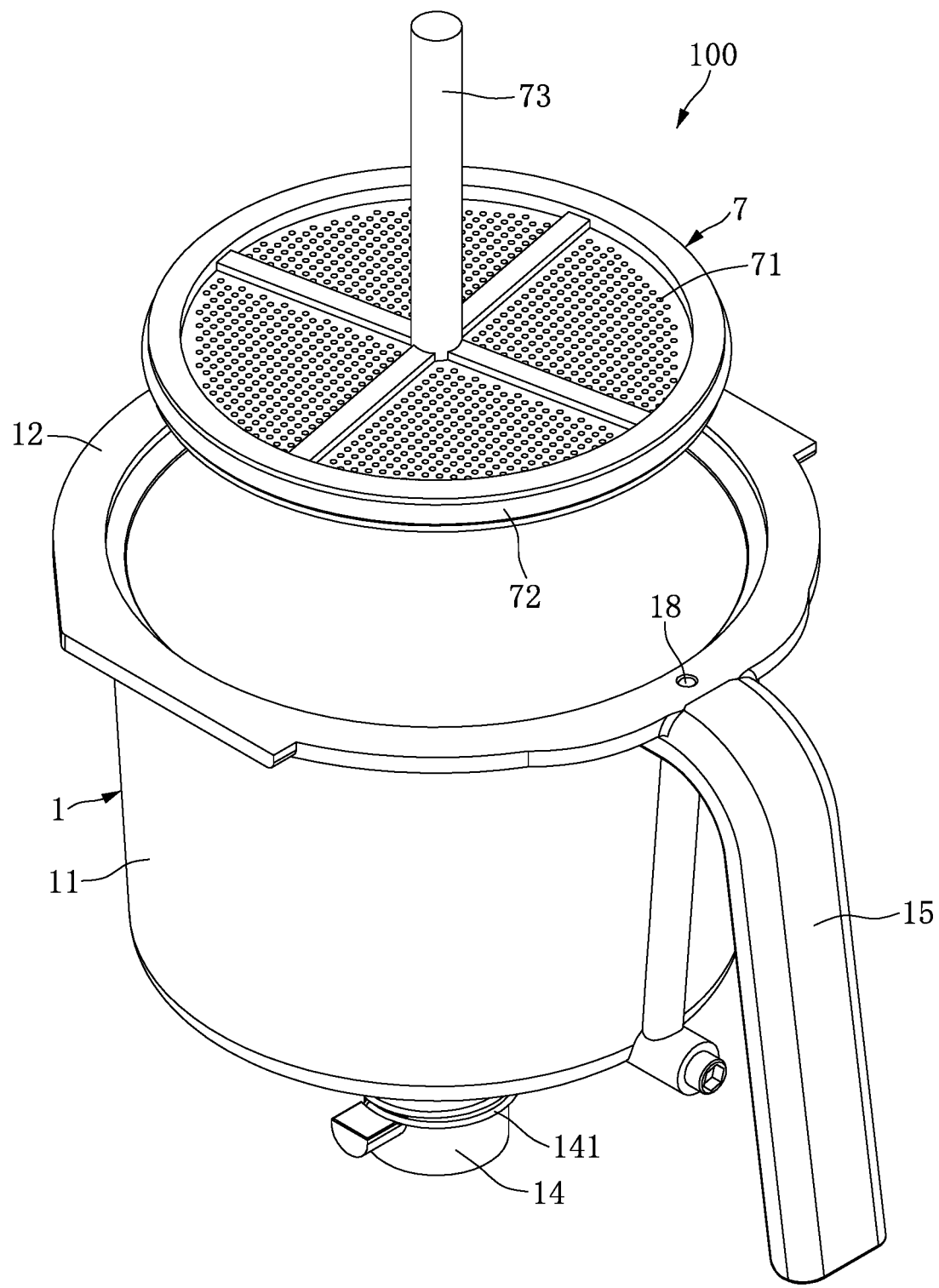
FIG. 10 is a three-dimensional exploded view of the second embodiment of the filter assembly according to the present disclosure.
Figure 11:
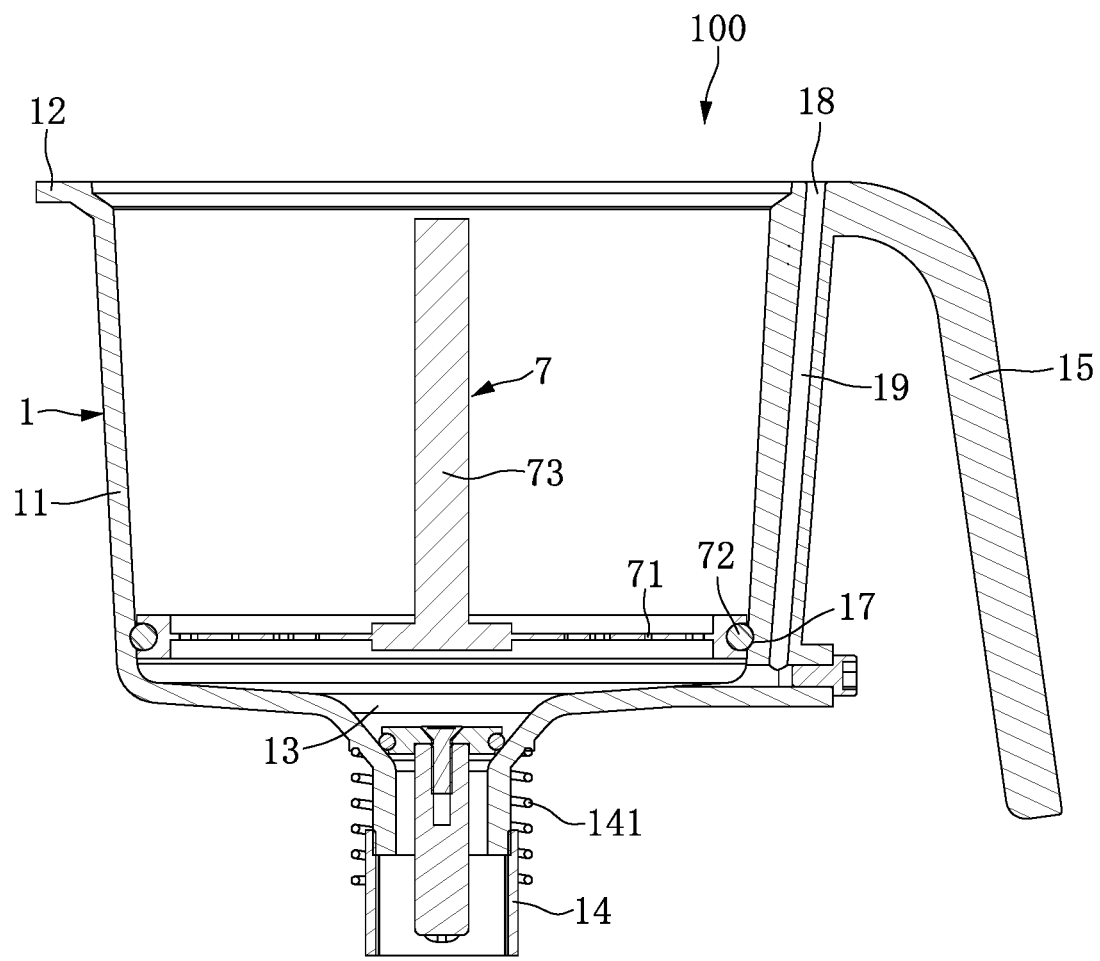
FIG. 11 is a sectional view of the second embodiment of the filter assembly according to the present disclosure.

Please refer to FIG. 10 and FIG. 11. In the present embodiment, a filter disc 7 is used to replace the inner filter cup 2 mentioned above. The filter assembly 100 includes the outer filter cup 1 and the filter disc 7. A groove 17 is formed at a bottom of an inner edge of the outer cup-body 11 of the outer filter cup 1. The filter disc 7 includes a filter screen 71 and an O-ring 72. The O-ring 72 surrounds and is connected on an outer periphery of the filter screen 71, the filter screen 71 is disposed with a grasp rod 73, the filter disc 7 is received in the outer cup-body 11 of the outer filter cup 1, the O-ring engages and is positioned in the groove 17. A vapor inlet 18 is disposed on a top of the outer filter cup 11, one side of the outer filter cup 11 is disposed with a vapor diffusion outlet 19, the vapor diffusion outlet 19 connects with the vapor inlet 18, the vapor diffusion outlet 19 protrudes and extends along the side of the outer filter cup 11 to the bottom of the outer filter cup 11 and connects with the space between the bottom of the filter disc 7 and the outer cup-body 11, so that the vapor can be introduced from the vapor inlet 18 and diffused through the vapor diffusion outlet 19. The operation of the present embodiment and that of the former embodiment are substantially the same. When the hot water is delivered to the outer filter cup 1, the vapor is introduced by the vapor inlet 18 of the outer filter cup 1, and moves downwardly through the vapor diffusion outlet 19 and upwardly into the outer filter cup 1 through the filter screen 71, thereby reheating and stirring the brewing substance. The filter disc 7 is washable.

Figure 12:
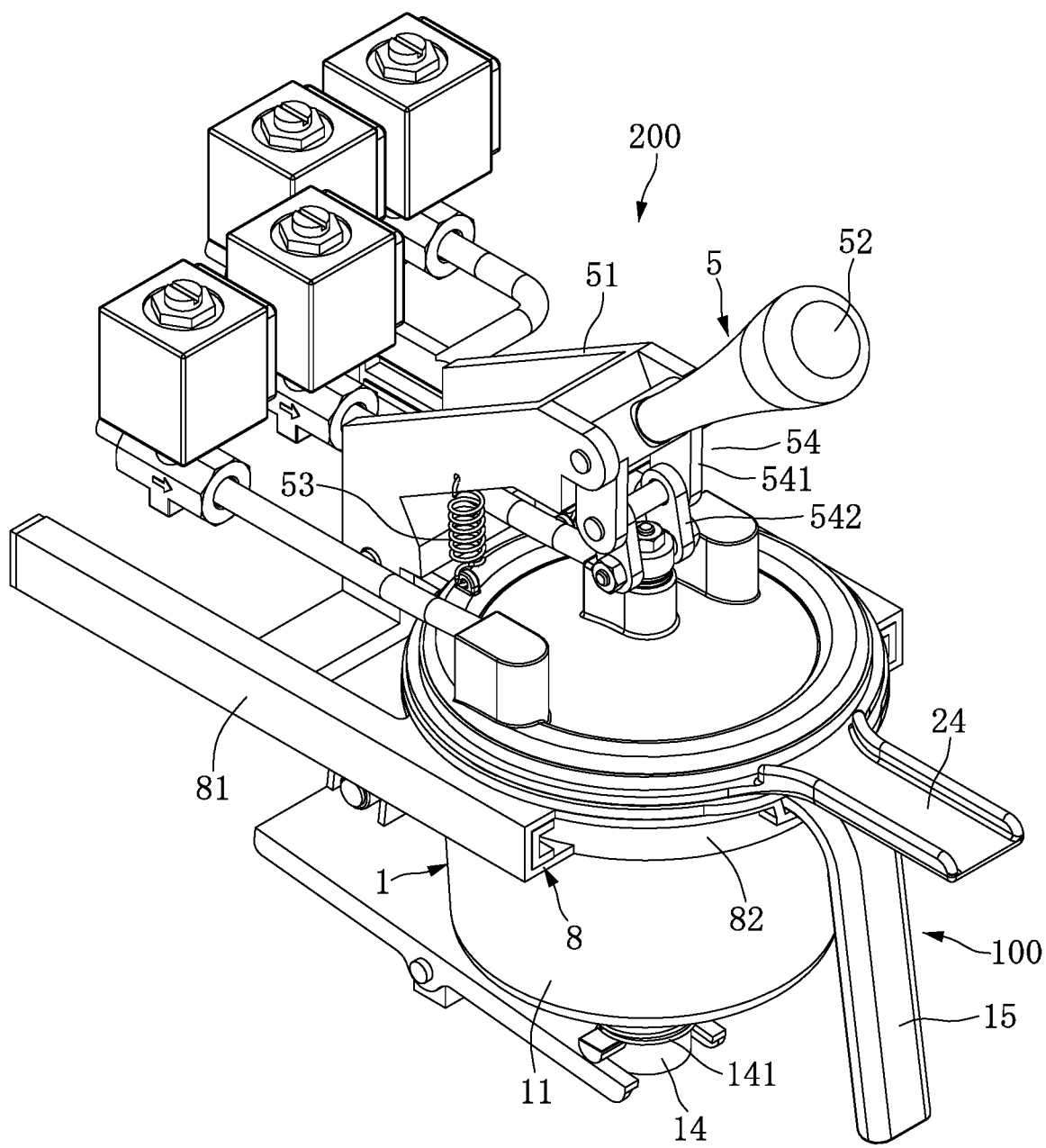
FIG. 12 is a three-dimensional view of the third embodiment of the infusion beverage brewing device according to the present disclosure.
Figure 13:
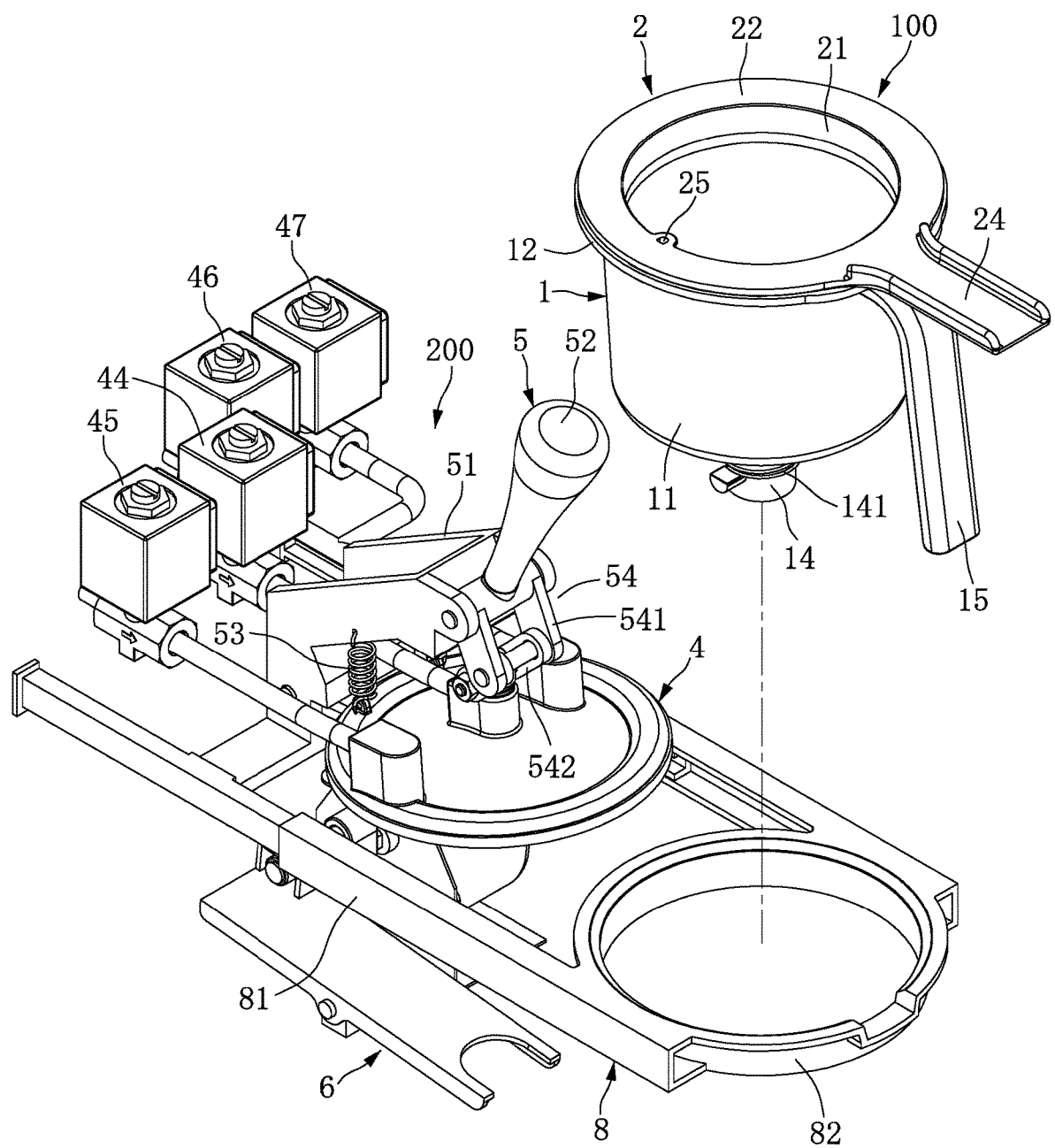
FIG. 13 is a three-dimensional exploded view of the third embodiment of the infusion beverage brewing device according to the present disclosure.

Please refer to FIG. 12 and FIG. 13. In the present embodiment, a sliding rail apparatus 8 is used to replace the cup retainer 3 mentioned above. The sliding rail apparatus 8 includes a sliding rail 81 and a ring-shaped cup retainer 82 disposed at the front end of the sliding rail 81. The cup retainer 82 has a shape corresponding to the filter assembly 100, thereby enabling the filter assembly 100 to be placed and positioned on the cup retainer 82 easily.

Please refer to FIG. 14. In the present embodiment, the sealing device 14 of the outer filter cup 1 can be disposed with a water nozzle 16 when the beverage infusion brewing device of the present disclosure is applied to the conventional brewing process. Here, the water nozzle 16 is replaceable, and the diameter of the water hole can be made according to different substances.

Figure 15:
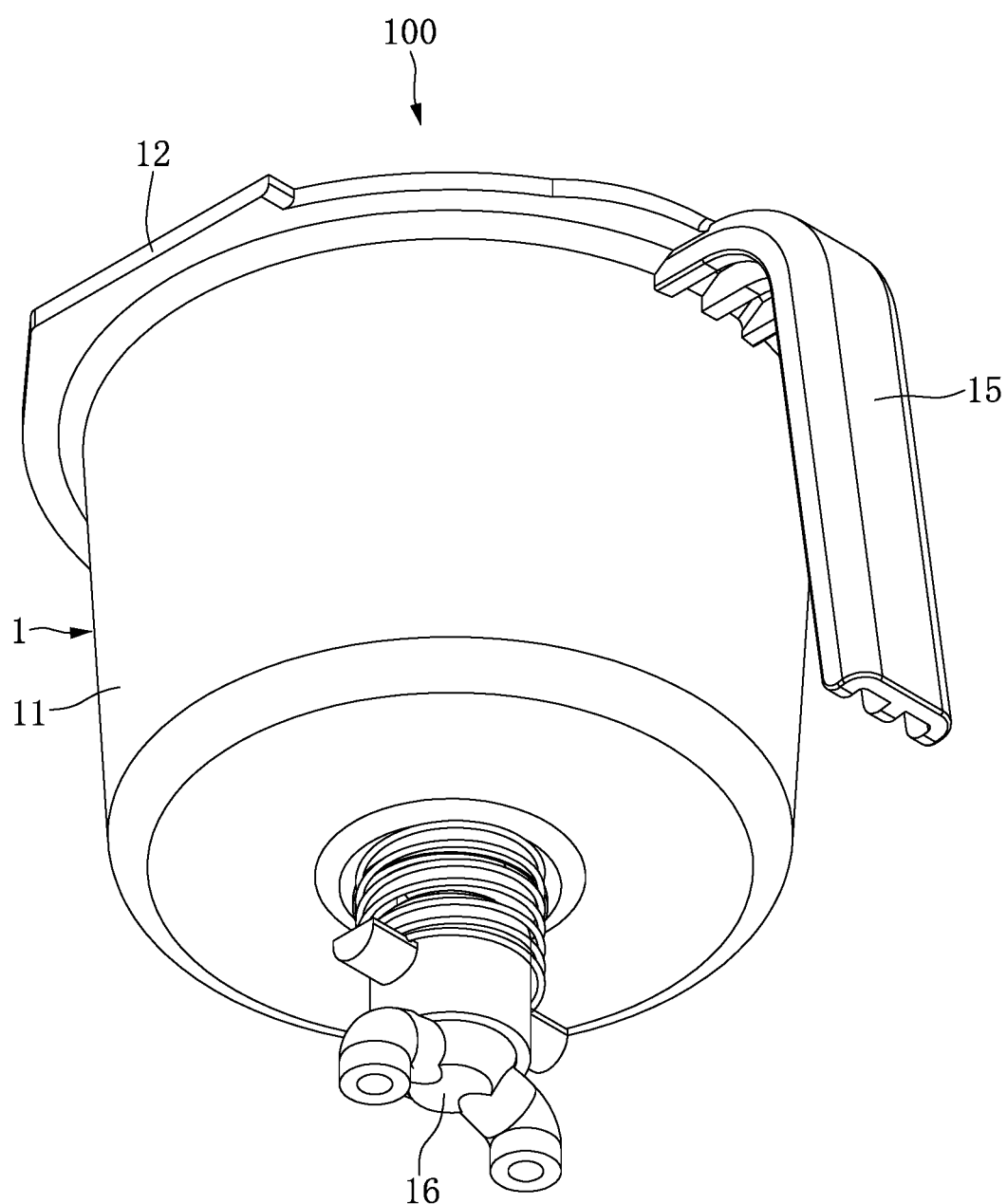
FIG. 15 is a three-dimensional view of the fifth embodiment of the filter assembly according to the present disclosure.

Please refer to FIG. 15. In the present embodiment, the water nozzle 16 is modified to be a dual water nozzle for brewing two cups of drinks at the same time.

Figure 16:
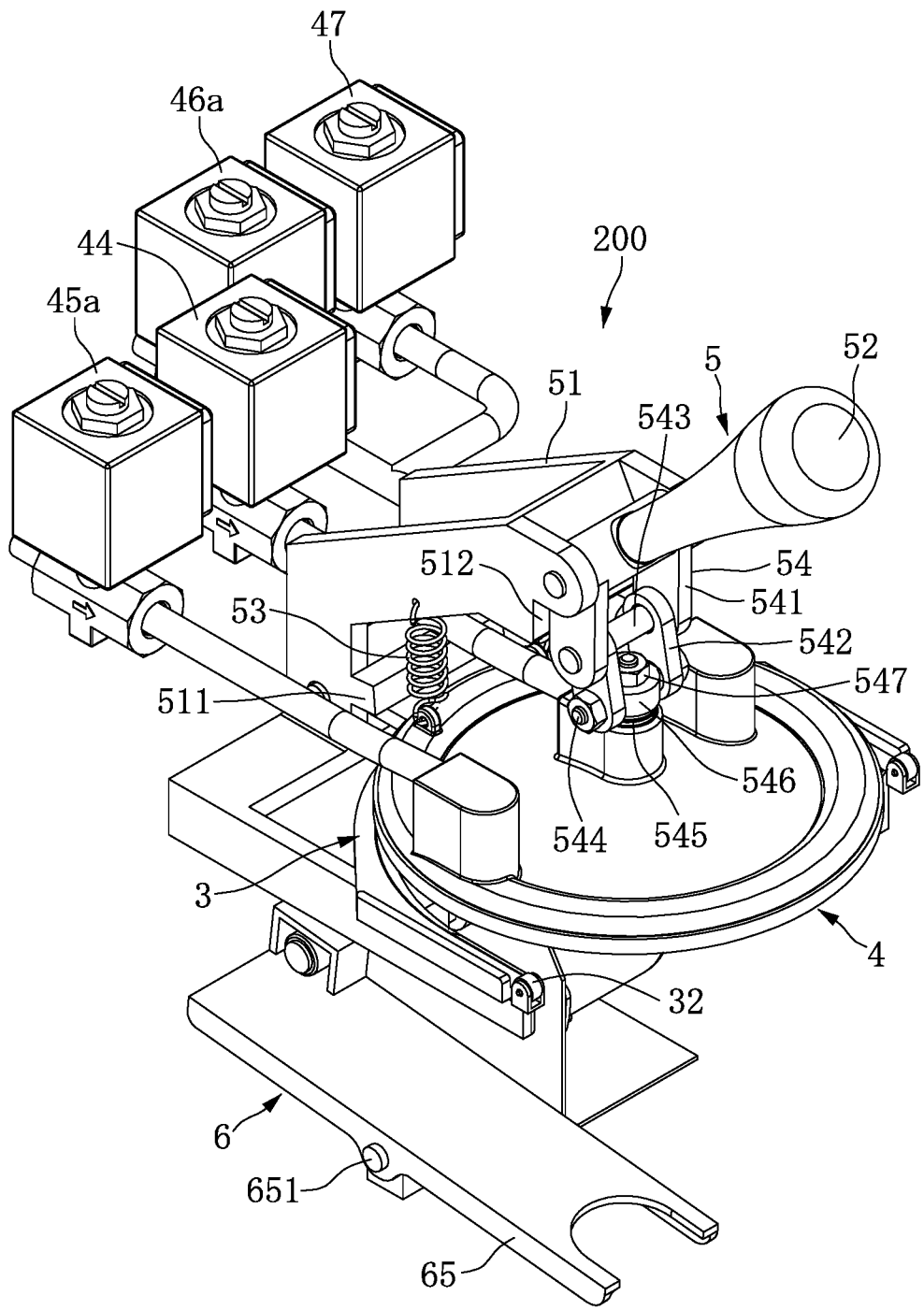
FIG. 16 is a three-dimensional view of the sixth embodiment of the brewing mechanism according to the present disclosure.

Please refer to FIG. 16. In the present embodiment, a first pump 45a and a second pump 46a are used to replace the first vapor valve 45 and the second vapor valve 46 mentioned above. The vapor portal 42 is connected to the first pump 45a, and the vapor portal and discharge outlet 43 is connected to the second pump 46a and the discharge valve 47. When it executes the stirring process without heating, the first pump 45a is used to introduce air for stirring the brewing substance. In addition, the second pump 46a can be turned on to produce the air pressure to push the liquid so as to accelerate the brewing process. The discharge valve 47 is used to discharge gas.

In summary, a beverage infusion brewing device provided by the present embodiment not only can brew and soak the brewing substance many times, but also reheat and stir the brewing substance for achieving a better effect on the extraction process. In addition, the present disclosure can complete the optimal brewing process for different brewing substances because the beverage infusion brewing device of the present disclosure adapts to conventional and multistage brewing processes. In addition to the simple operation and lower price, the present disclosure can feasibly be applied to various filter assemblies as long as the airtight portion is the same.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An infusion beverage brewing device, comprising:
   a filter assembly having an outer filter cup and an inner filter cup, the outer filter cup having an outer cup-body, a first upper edge formed on a top of the outer cup-body, the outer cup-body having a bottom outlet disposed with a sealing device; the inner filter cup having an inner cup-body, a top of the inner cup-body having a second upper edge, a filter screen disposed at a bottom of the inner cup-body, the top of the inner cup-body disposed with a vapor inlet, the inner cup-body of the inner filter cup received in the outer cup-body of the outer filter cup, the second upper edge stacked on the first upper edge, a gap formed between the inner cup-body and the outer cup-body, a vapor diffusion outlet disposed between the inner cup-body and the outer cup-body, and the vapor diffusion outlet connecting with the vapor inlet, and
   a brewing mechanism having a cup retainer, a cover and a controlling device, the cover disposed on the cup retainer, the controlling device connected to the cover, the filter assembly placed in the cup retainer, the upper edge of the outer filter cup disposed on the cup retainer, the cover selectively disposed on the filter assembly, the cover disposed with a sprinkle-nozzle and a vapor portal thereon, and the vapor portal corresponding to the vapor inlet of the inner filter cup;
   wherein the controlling device comprises a fixed base, a handle, a tension spring and a link member, the fixed base is connected to the cup retainer, one end of the handle is pivotally connected to the fixed base, the tension spring is connected between the fixed base and the cover, the fixed base is disposed with a first positioning point, the cover is pulled upward to contact the first positioning point by the tension spring, and the link member is disposed between the handle and the cover; wherein the link member comprises an upper link member, a lower link member, a first pivot axis, a second pivot axis, and a plurality of disc springs, one end of the upper link member is connected to one end of the handle, one end of the lower link member is pivotally connected to the other end of the upper link member through the first pivot axis, the second pivot axis is pivotally connected to the other end of the lower link member, a washer is disposed between the second pivot axis, the top of the cover is disposed with a connecting base, the connecting base is disposed with a stud thereon, the plurality of disc springs are disposed between the washer and the connecting base, and the stud penetrates the plurality of disc springs and the washer and is fixed by a nut.

2. The infusion beverage brewing device according to claim 1, wherein the sealing device is normally closed and controlled to open or close by a liquid release controlling device.

3. The infusion beverage brewing device according to claim 2, wherein the liquid release controlling device comprises a gear motor, a link arm, a roller, a sensing switch and a lever; one end of the lever is connected to the gear motor, the other end of the lever is connected to the roller, the sensing switch is disposed on the link arm, and the lever supports the roller and the bottom of the sealing device through a fulcrum point.

4. The infusion beverage brewing device according to claim 1, wherein the vapor diffusion outlet is disposed at an outer edge of the inner cup-body, and extends to the bottom of the inner cup-body.

5. The infusion beverage brewing device according to claim 1, wherein an O-ring is disposed between the first upper edge and the second upper edge, the bottom of the cover is disposed with a sealing gasket, and the sealing gasket is between the bottom of the cover and the second upper edge.

6. The infusion beverage brewing device according to claim 1, wherein the cup retainer has a U-shaped structure, two sides of the cup retainer are respectively disposed with an elastic piece, a front end of the elastic piece is pivotally disposed with a wheel, and the wheel is at the front end of the cup retainer, thereby positioning the filter assembly.

7. The infusion beverage brewing device according to claim 1, wherein the cup retainer has a ring-shaped structure, and is disposed at a front end of a sliding rail.

8. The infusion beverage brewing device according to claim 1, wherein the sprinkle-nozzle is connected to a hot water valve, the vapor portal is connected to a first vapor valve, and a vapor portal and discharge outlet is disposed on the cover and connected to a second vapor valve and a discharge valve.

9. The infusion beverage brewing device according to claim 1, wherein the sprinkle-nozzle is connected to a hot water valve, the vapor portal is connected to a first pump, and the vapor portal and discharge outlet is disposed on the cover and connected to a second pump and a discharge valve.

* * * * *